(12) United States Patent
Peterson

(10) Patent No.: US 11,236,500 B2
(45) Date of Patent: Feb. 1, 2022

(54) BUILT-UP BEAMS AND BUILDING STRUCTURES

(71) Applicant: Folding Holdings, LLC, Bothell, WA (US)

(72) Inventor: Elliot Peterson, Bothell, WA (US)

(73) Assignee: Folding Holdings, LLC, Bothell, WA (US)

( * ) Notice: Subject to any disclaimer, the term of this patent is extended or adjusted under 35 U.S.C. 154(b) by 1 day.

(21) Appl. No.: 16/862,411

(22) Filed: Apr. 29, 2020

(65) Prior Publication Data

US 2021/0340752 A1 Nov. 4, 2021

(51) Int. Cl.
| | |
|---|---|
| *E04B 1/19* | (2006.01) |
| *E04C 3/04* | (2006.01) |
| *E04C 3/14* | (2006.01) |
| *B23P 13/02* | (2006.01) |
| *B23P 15/00* | (2006.01) |

(52) U.S. Cl.
CPC ............... *E04B 1/19* (2013.01); *B23P 13/02* (2013.01); *E04C 3/04* (2013.01); *E04C 3/14* (2013.01); *B23P 15/00* (2013.01); *E04C 2003/0413* (2013.01); *E04C 2003/0452* (2013.01); *E04C 2003/0465* (2013.01); *Y10T 29/49364* (2015.01); *Y10T 29/49963* (2015.01)

(58) Field of Classification Search
CPC .. B23P 13/02; B23P 15/00; E04C 3/04; E04C 3/14; E04C 2003/0452; E04C 2003/0413; E04C 2003/0465; E04B 1/19; Y10T 29/49963; Y10T 29/49364
See application file for complete search history.

(56) References Cited

U.S. PATENT DOCUMENTS

| | | | | |
|---|---|---|---|---|
| 5,669,197 | A | * | 9/1997 | Bodnar .................... E04B 1/161 52/600 |
| 6,122,888 | A | * | 9/2000 | Bodnar .................... E04B 1/161 264/277 |
| 6,131,362 | A | * | 10/2000 | Buecker .................... E04B 5/10 29/897.35 |
| 10,669,718 | B2 | * | 6/2020 | Pryor ....................... E04H 9/024 |
| 2004/0250503 | A1 | * | 12/2004 | Bigelow .................. E04C 3/291 52/838 |
| 2019/0292783 | A1 | * | 9/2019 | Pryor ......................... E04C 3/38 |
| 2020/0291653 | A1 | * | 9/2020 | Pryor ..................... E04B 1/2403 |

FOREIGN PATENT DOCUMENTS

| | | | | |
|---|---|---|---|---|
| CN | 2014-Q69347 | * | 6/2014 | ............... E04B 1/02 |
| CN | 103882975 A | | 6/2014 | |
| CN | 2019-59013 E | * | 6/2019 | ............. E04C 3/293 |
| CN | 109930747 A | | 6/2019 | |
| KR | 10-2012-0075190 A | | 7/2012 | |
| KR | 20120075190 A | * | 7/2012 | ............. E04C 3/086 |

* cited by examiner

*Primary Examiner* — Bayan Salone
(74) *Attorney, Agent, or Firm* — Seed IP Law Group LLP

(57) ABSTRACT

A built-up beam includes a pair of I-beams each having opposing flanges, a web that extends between the opposing flanges, a plurality of flange openings in each of the opposing flanges, a plurality of web openings in the web, and a plurality of bolt holes in one of the opposing flanges. The I-beams are stacked together flange-to-flange in a stacked beam configuration and a plurality of bolts extend through the plurality of bolt holes and secure the pair of I-beams together in the stacked beam configuration.

11 Claims, 9 Drawing Sheets

BUILT-UP BEAMS AND BUILDING STRUCTURES

STATEMENT OF GOVERNMENT INTEREST

This invention was made with government support under contract no. FA4819-15-H-0006 awarded by the Air Force Civil Engineer Center. The government has certain rights in this invention.

BACKGROUND

Technical Field

The present disclosure relates generally to built-up beams and building structures, and in particular to beams built-up from a plurality of subcomponents including I-beams, such as for use in pre-engineered building structures.

Description of the Related Art

A wide variety of structural components are commercially available for use as beams, girders, joists, and other similar structural elements. Such products can be made from a wide variety of materials, including wood or other natural materials, steel, aluminum, or other metallic materials, or plastic, polymeric, or other materials. Standardized structural steel components, as one example, have traditionally been fabricated in the form of an elongated beam having a constant profile or cross-sectional shape along its length. Such components can be advantageous because they can be fabricated consistently and repeatedly relatively efficiently, such as by well-established hot and/or cold rolling processes.

Such standardized structural steel components suffer from drawbacks, however, in that their standardization limits the degree to which they can be customized. Therefore, efforts have continued to be made to provide structural steel components that are tailored, and therefore more efficient, for specific use cases. Built-up steel components, which include a plurality of individual steel elements coupled to one another, such as by welding or riveting, represent one type of such efforts.

BRIEF SUMMARY

A method of fabricating a built-up beam may be summarized as comprising: obtaining a pair of I-beams, each I-beam having a uniform cross-sectional profile over an entirety of a longitudinal length thereof; for each of the pair of I-beams, cutting a plurality of web openings and a plurality flange openings in the I-beam to vary the cross-sectional profile of the I-beam over the longitudinal length thereof; for each of the pair of I-beams, cutting a plurality of bolt holes distinct from the plurality of flange openings in one of opposing flanges of the I-beam along the longitudinal length thereof; stacking the pair of I-beams together flange-to-flange to form a stacked beam configuration in which the plurality of bolt holes of each I-beam align with each other; and bolting the pair of I-beams together via the plurality of bolt holes to secure the pair of I-beams together in the stacked beam configuration.

Each of the pair of I-beams may be a rolled I-beam. Each of the pair of I-beams may have a common standardized cross-sectional profile. Cutting the plurality of web openings and the plurality flange openings in each I-beam may include CNC thermal cutting each of the openings. The method may further comprise, for each of the pair of I-beams, cutting a first notch and a second notch into each of opposing ends of a web thereof. The method may further comprise, for each of the pair of I-beams, coupling a respective end cap plate to each of opposing ends thereof.

The method may further comprise: obtaining a complementary pair of I-beams, each I-beam having a uniform cross-sectional profile over an entirety of a longitudinal length thereof; for each of the complementary pair of I-beams, cutting a plurality of web openings and a plurality flange openings in the I-beam to vary the cross-sectional profile of the I-beam over the longitudinal length thereof; for each of the complementary pair of I-beams, cutting a plurality of bolt holes distinct from the plurality of flange openings in one of opposing flanges of the I-beam along the longitudinal length thereof; stacking the complementary pair of I-beams together flange-to-flange to form a stacked beam configuration in which the plurality of bolt holes of each I-beam align with each other; and bolting the complementary pair of I-beams together via the plurality of bolt holes to secure the complementary pair of I-beams together in the stacked beam configuration; and coupling the pair of I-beams in the stacked beam configuration to the complementary pair of I-beams in the stacked beam configuration via one or more beam spanning members.

Coupling the pair of I-beams in the stacked beam configuration to the complementary pair of I-beams in the stacked beam configuration the built-up beam may include coupling the I-beams together to form a built-up box beam. Coupling the pair of I-beams in the stacked beam configuration to the complementary pair of I-beams in the stacked beam configuration via one or more beam spanning members may include bolting at least one plate between flanges of the I-beams. Coupling the pair of I-beams in the stacked beam configuration to the complementary pair of I-beams in the stacked beam configuration via one or more beam spanning members may include bolting opposing upper and lower plates between flanges of the I-beams.

A built-up beam may be summarized as comprising: a pair of I-beams, each having opposing flanges, a web that extends between the opposing flanges, a plurality of flange openings in each of the opposing flanges, a plurality of web openings in the web, and a plurality of bolt holes in one of the opposing flanges, and wherein the I-beams are stacked together flange-to-flange in a stacked beam configuration; and a plurality of bolts extending through the plurality of bolt holes and securing the pair of I-beams together in the stacked beam configuration.

Each of the pair of I-beams may be a rolled I-beam. The built-up beam may further comprise: a pair of complementary I-beams, each having opposing flanges, a web that extends between the opposing flanges, a plurality of flange openings in each of the opposing flanges, a plurality of web openings in the web, and a plurality of bolt holes in one of the opposing flanges, and wherein the complementary I-beams are stacked together flange-to-flange in a stacked beam configuration; a plurality of bolts extending through the plurality of bolt holes and securing the complementary pair of I-beams together in the stacked beam configuration; and one or more beam spanning members extending between the pair of I-beams and the pair of complementary pair of I-beams.

The built-up beam may be configured as a built-up box beam. The one or more beam spanning members extending between the pair of I-beams and the pair of complementary pair of I-beams may comprise a plate structure. The one or more beam spanning members extending between the pair of I-beams and the pair of complementary pair of I-beams may comprise upper and lower plate structures. The built-up beam may be symmetrical about a first plane of symmetry, a second plane of symmetry that is perpendicular to the first plane of symmetry, and a third plane of symmetry that is perpendicular to both the first plane of symmetry and the second plane of symmetry.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
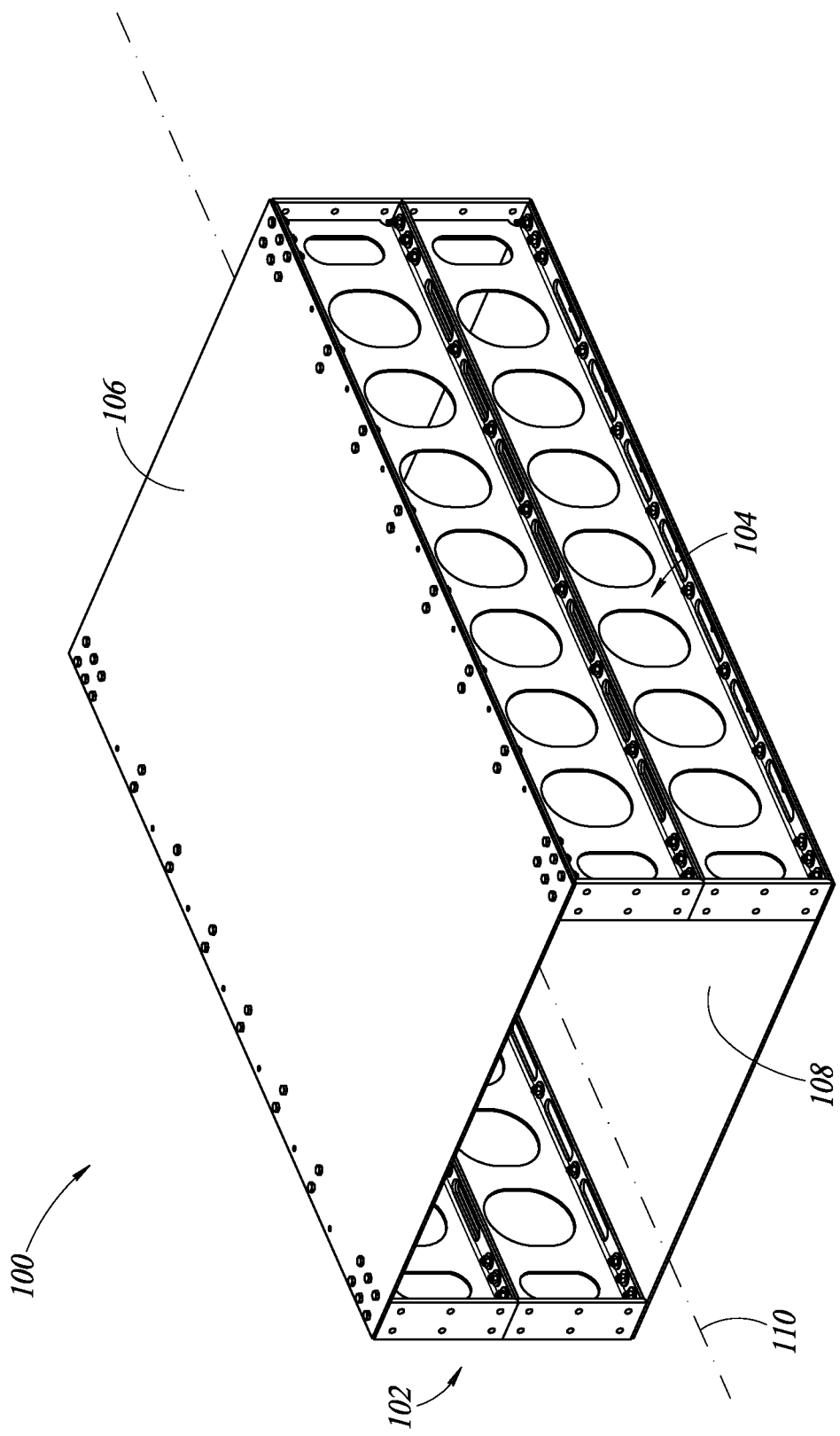
FIG. 1 illustrates a perspective view of a built-up box beam.
Figure 2:
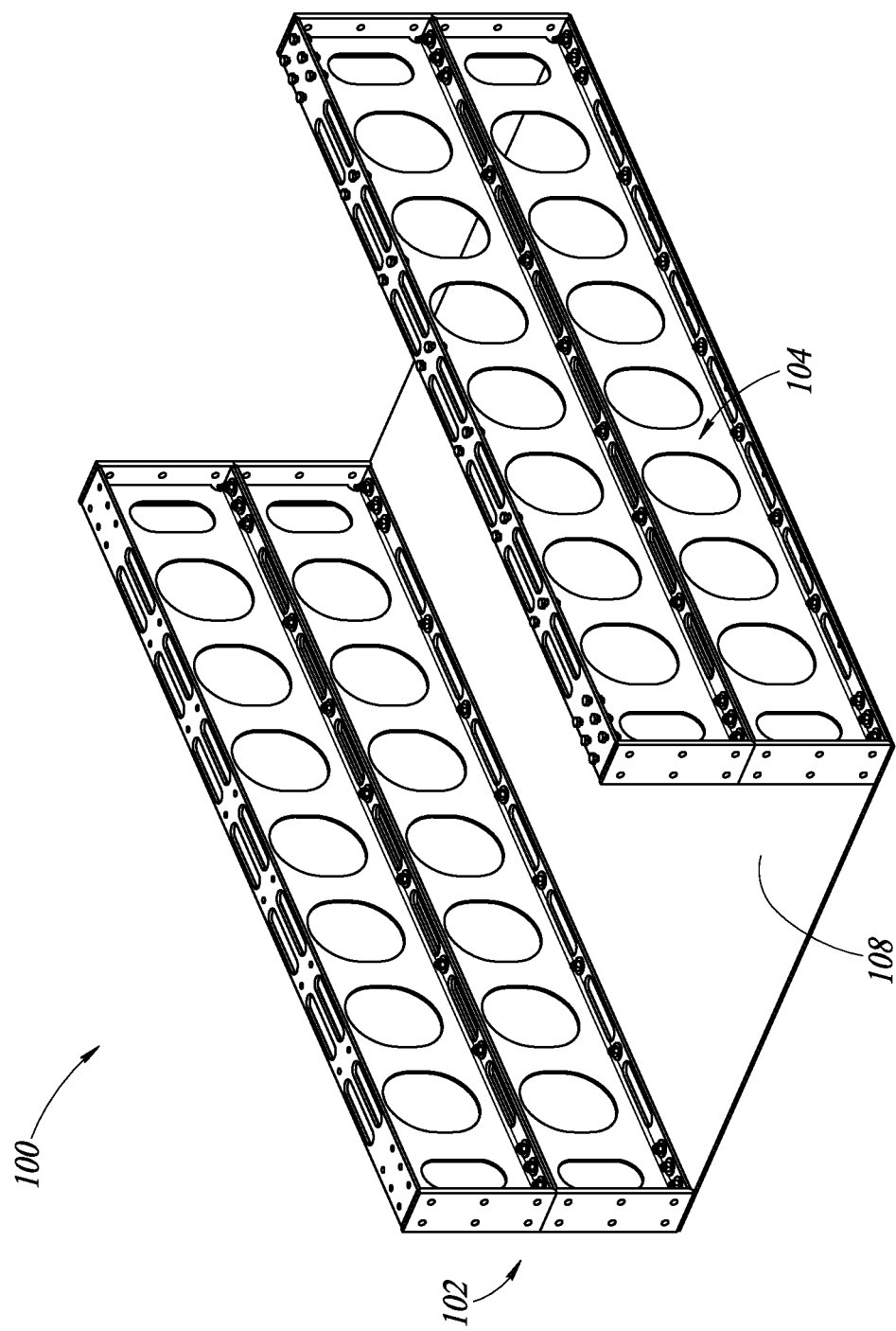
FIG. 2 illustrates a perspective view of the built-up box beam of FIG. 1 with a plate component thereof removed to illustrate other features of the box beam.
Figure 3:
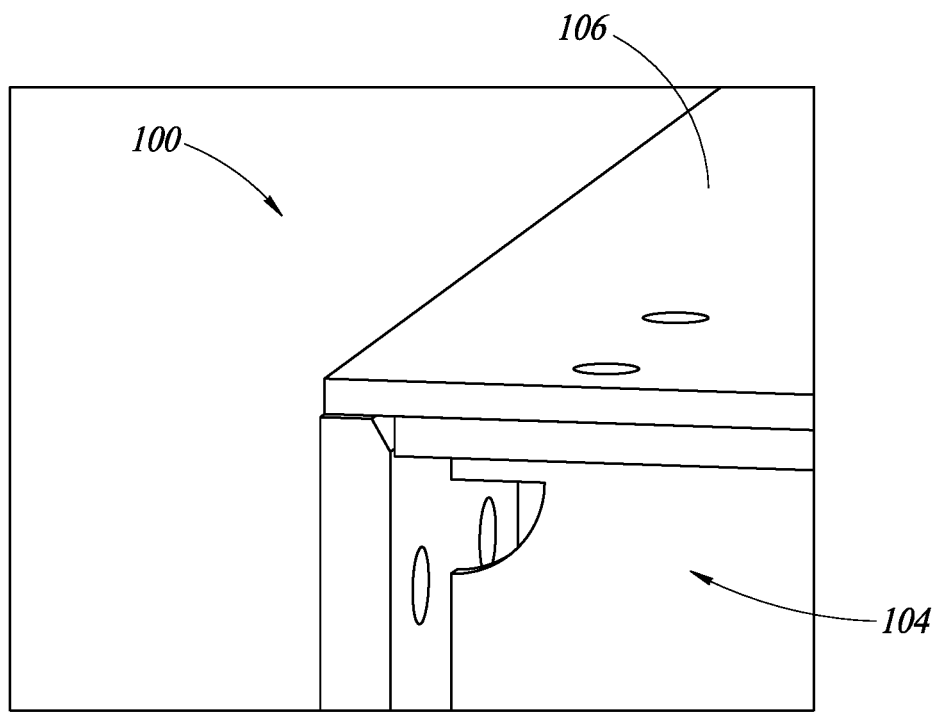
FIG. 3 illustrates a different perspective view of components of the built-up box beam of FIG. 1 at a larger scale to illustrate other features of the box beam.

FIG. 1 illustrates a front, right, and top perspective view of a built-up box beam 100. As illustrated in FIG. 1, the built-up box beam 100 includes a first individual built-up beam 102, which may be referred to herein as a left beam 102, a second individual built-up beam 104, which may be referred to herein as a right beam 104, a first plate 106, which may be referred to herein as a top plate 106, and a second plate 108, which may be referred to herein as a bottom plate 108. As also illustrated in FIG. 1, the built-up box beam 100 includes a central longitudinal axis 110 that extends front-to-back along a length of the built-up box beam 100, in a direction parallel to lengths of the left and right beams 102 and 104 and parallel to lengths of the top and bottom plates 106 and 108, and in a direction perpendicular to a rectangular inner profile of the built-up box beam 100 defined by an inner surface of each of the left beam 102, right beam 104, top plate 106, and bottom plate 108. FIG. 2 illustrates the same front, right, and top perspective view of the built-up box beam 100 with the top plate 106 removed, and FIG. 3 illustrates a different perspective view of some features of the box beam 100 at a larger scale.

As used herein, terms of orientation or relative location such as "top," "bottom," "left," "right," "front," "rear," etc., are arbitrary labels used for the sake of convenience and clarity of the description herein. In fact, the entire built-up box beam 100 is symmetrical top-to-bottom, side-to-side, and front-to-back, such that these labels are inherently arbitrary. Further, in practical applications, the built-up box beam 100 does not have a designated or required orientation, and can be used in different orientations such that a component labeled herein as "top" may in fact be at a bottom or a side of the built-up box beam 100. Further, in practical applications, the "left" and "right" sides and the "front" and "rear" ends of the built-up box beam 100 may only be defined by the perspective of a viewer, such that the components to which such labels are assigned may change as the location of the viewer changes with respect to the built-up box beam 100.

Nevertheless, the use of such terms is internally consistent herein. Further, in general, the built-up box beam 100 is designed to carry loads extending in a direction that extends from the plane of the top plate 106 to the plane of the bottom plate 108, that is, vertical loads with respect to gravity if the top and bottom plates 106, 108 are located at the physical top and bottom of the built-up box beam 100 with respect to gravity. Furthermore, the "lengths" of the components referred to herein generally refer to the longest outer rectilinear dimension of such components, which for most components is in a direction parallel to the central longitudinal axis 110. Additionally, "inner" and "outer," as used herein, are to be understood as being with respect to a center of the built-up box beam 100.

Figure 4:
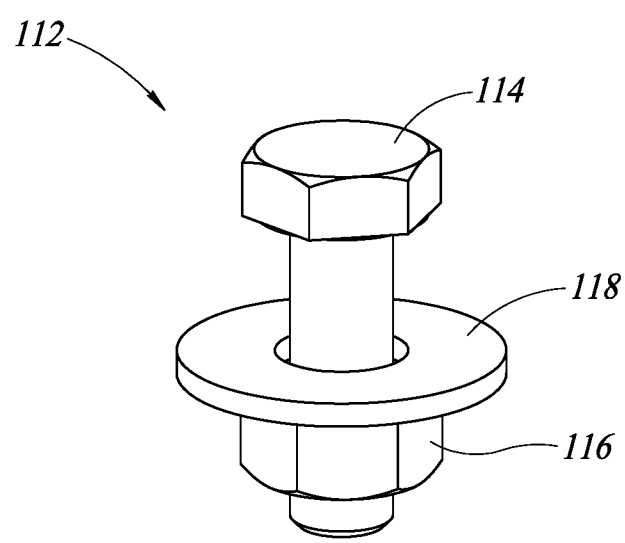
FIG. 4 illustrates a bolt assembly, a plurality of which can be used to couple the components of the built-up box beam of FIG. 1 to one another.

FIG. 4 illustrates a bolt assembly 112, a plurality of which can be used to couple the components of the built-up box beam 100 to one another. As illustrated in FIG. 4, the bolt assembly 112 includes a threaded bolt 114, a threaded nut 116 threaded onto the threaded bolt 114, and a washer 118 in a captive position between the threaded nut 116 and a head portion of the threaded bolt 114.

Figure 5:
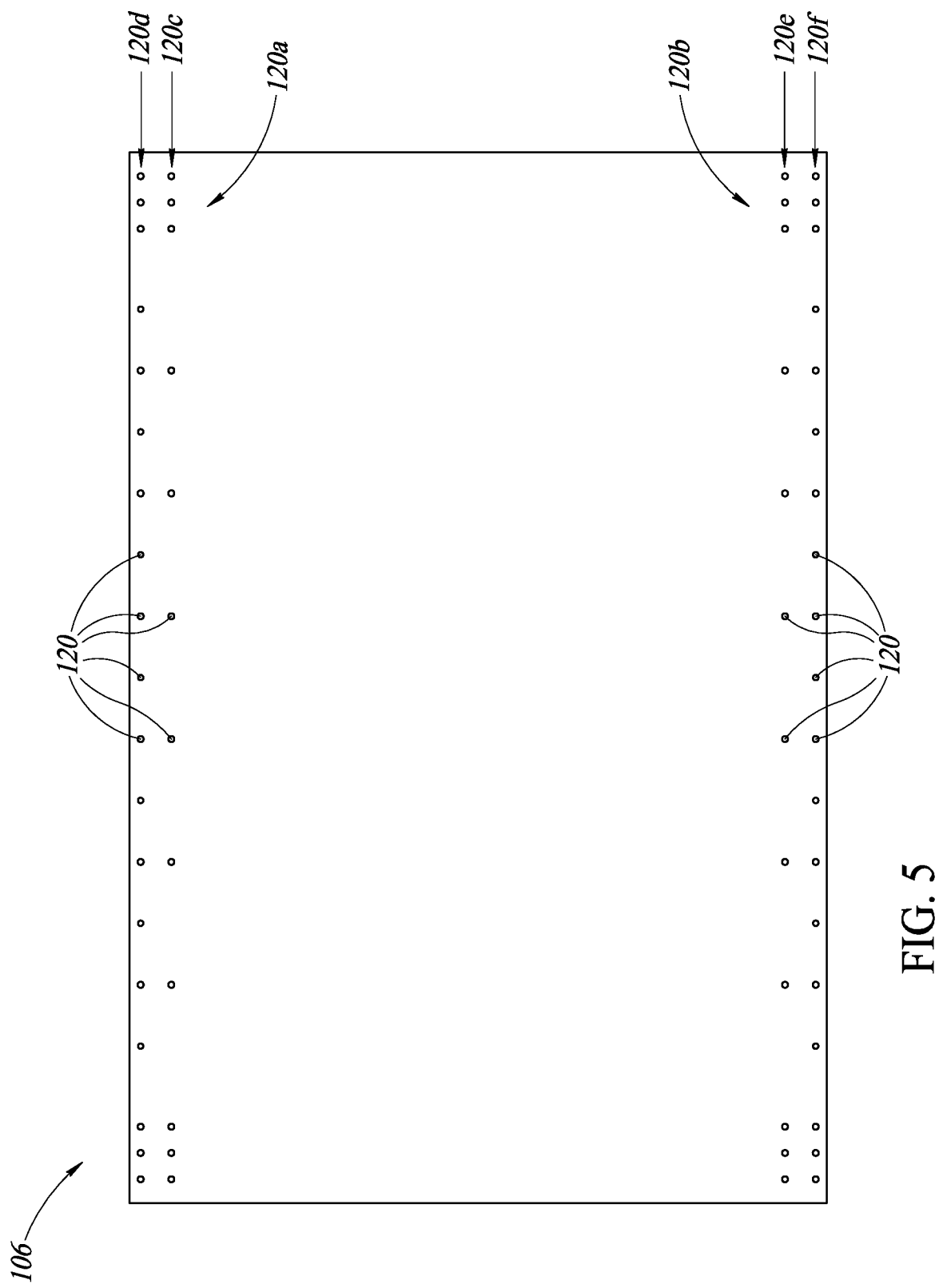
FIG. 5 illustrates a plan view of the plate component of the built-up box beam of FIG. 1.

FIG. 5 illustrates a top plan view of the top plate 106. As illustrated in FIGS. 1 and 5, the top plate 106 includes a rectilinear plate having a length aligned with the central longitudinal axis 110, a width perpendicular to its length that extends in a direction from the left beam 102 to the right beam 104, and a thickness perpendicular to its length and to its width, where its thickness is significantly smaller than both its length and its width. As illustrated in FIG. 5 in particular, the top plate 106 includes a plurality of openings, apertures, or bolt holes 120 that extend through the top plate 106 along respective axes aligned with or parallel to its thickness.

As illustrated in FIG. 5, the top plate 106 includes a first or left set 120a of bolt holes 120 that extends along a left side of the top plate 106 and a second or right set 120b of bolt holes 120 that extends along a right side of the top plate 106. The left set 120a of bolt holes 120 is arranged in an inner line 120c of bolt holes 120 and an outer line 120d of bolt holes 120, and the right set 120b of bolt holes 120 is arranged in an inner line 120e of bolt holes 120 and an outer line 120f of bolt holes 120, where each of the inner line 120c, the outer line 120d, the inner line 120e, and the outer line 120f extend front-to-back along the length of the built-up box beam 100 parallel to the central longitudinal axis 110.

As further illustrated in FIG. 5, the left set 120a of bolt holes 120 includes paired bolt holes 120 that are aligned with one another from left-to-right with respect to the built-up box beam 100. Such paired bolt holes 120 include a first bolt hole 120 in the inner line 120c and a second bolt hole 120 in the outer line 120d that is adjacent to the first bolt hole 120, that is, as close as possible given the distance between the inner and outer lines 120c and 120d. For example, from front-to-back, the left set 120a of bolt holes 120 includes three sets of paired bolt holes 120 proximate the front of the top plate 106, then a single unpaired bolt hole 120 in the outer line 120d, then a set of paired bolt holes 120, then a single unpaired bolt hole 120 in the outer line 120d, then a set of paired bolt holes 120, then a single unpaired bolt hole 120 in the outer line 120d, then a set of paired bolt holes 120, then a single unpaired bolt hole 120 in the outer line 120d, then a set of paired bolt holes 120, then a single unpaired bolt hole 120 in the outer line 120d, then a set of paired bolt holes 120, then a single unpaired bolt hole 120 in the outer line 120d, then a set of paired bolt holes 120, then a single unpaired bolt hole 120 in the outer line 120d, then three sets of paired bolt holes 120 proximate the rear of the top plate 106.

As further illustrated in FIG. 5, the right set 120b of bolt holes 120 includes paired bolt holes 120 that are aligned with one another from left-to-right with respect to the built-up box beam 100. Such paired bolt holes 120 include a first bolt hole 120 in the inner line 120e and a second bolt hole 120 in the outer line 120f that is adjacent to the first bolt hole 120, that is, as close as possible given the distance between the inner and outer lines 120e and 120f. For example, from front-to-back, the right set 120b of bolt holes 120 includes three sets of paired bolt holes 120 proximate the front of the top plate 106, then a single unpaired bolt hole 120 in the outer line 120f, then a set of paired bolt holes 120, then a single unpaired bolt hole 120 in the outer line 120f, then a set of paired bolt holes 120, then a single unpaired bolt hole 120 in the outer line 120f, then a set of paired bolt holes 120, then a single unpaired bolt hole 120 in the outer line 120f, then a set of paired bolt holes 120, then a single unpaired bolt hole 120 in the outer line 120f, then a set of paired bolt holes 120, then a single unpaired bolt hole 120 in the outer line 120f, then a set of paired bolt holes 120, then a single unpaired bolt hole 120 in the outer line 120f, then three sets of paired bolt holes 120 proximate the rear of the top plate 106.

The top plate 106 is, individually, symmetrical front-to-back, side-to-side, and top-to-bottom. The bottom plate 108 can be identical to or incorporate any of the features of the top plate 106. As illustrated in FIG. 1, the bottom plate 108 is spaced apart from but parallel to the top plate 106, such that each spans across a respective opposite end of the built-up box beam 100. Further, the top plate 106 and the bottom plate 108 are positioned spatially directly on top of one another, such that their respective outer edges or peripheries align with one another when the built-up box beam 100 is viewed from above or below. Thus, the top plate 106 and the bottom plate 108, taken together, are collectively symmetrical front-to-back, side-to-side, and top-to-bottom.

Figure 6:
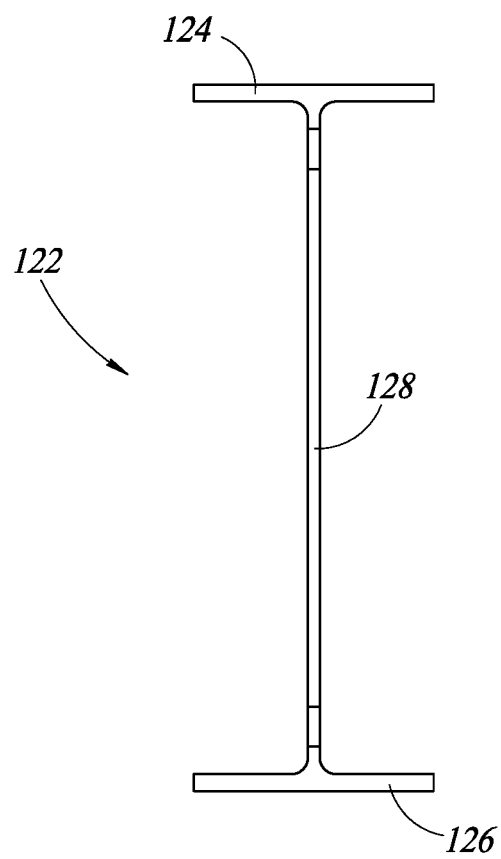
FIG. 6 illustrates an end view of an I-beam of the built-up box beam of FIG. 1.

FIG. 6 illustrates a front end, profile view of an I-beam 122 of the built-up box beam 100. As illustrated in FIG. 6, the I-beam 122 has a standard I-beam profile or cross-sectional shape, which may conform to any of a wide variety of standardized S-section, W-section, H-beam, or other standardized profiles. Thus, the I-beam 122 may be formed from a standard, commercially available I-beam in any of such profiles, which may be initially manufactured in accordance with any known methods, including hot rolling and/or cold rolling techniques. As illustrated in FIG. 6, the I-beam 122 includes a first or upper flange 124, a second or lower flange 126, and a web 128 that extends from the upper flange 124 to the lower flange 126. In use, the flanges 124 and 126 can carry bending moments or components thereof, and the web 128 can carry shear forces, as generally known in the art.

Figure 7:
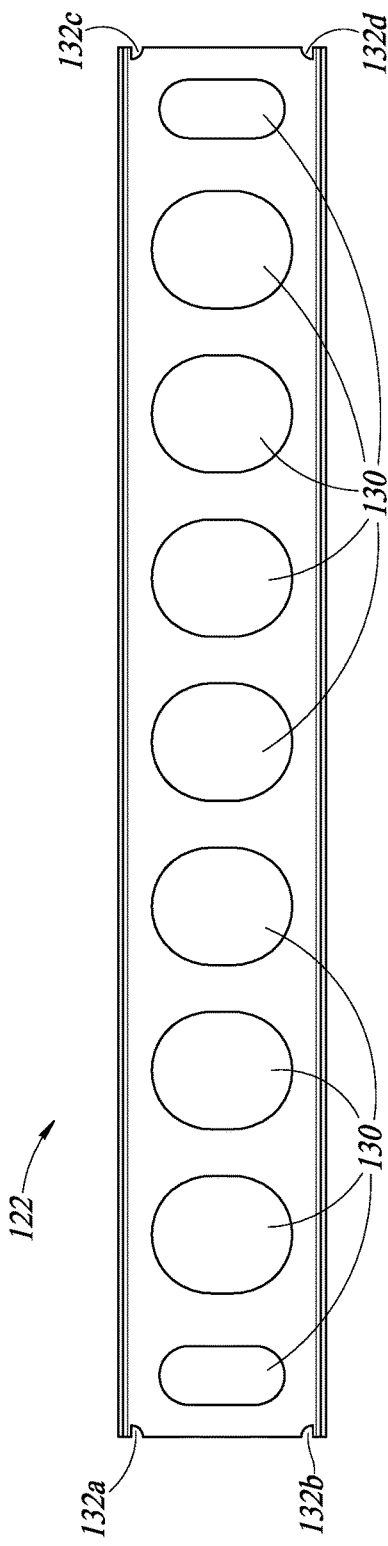
FIG. 7 illustrates a side view of the I-beam of FIG. 6.

FIG. 7 illustrates a side view of the I-beam 122. As illustrated in FIG. 7, the web 128 of the I-beam 122 has a plurality of apertures, cutouts, or openings 130 formed therein. For example, the I-beam 122 can include nine web openings 130 arranged in a line extending from the front of the I-beam 122 to the rear of the I-beam 122 such that they are aligned with one another in the direction extending from the upper flange 124 to the lower flange 126. As illustrated in FIG. 7, each of the web openings 130 can have an overall circular, oval, elliptical, or oblong shape, or can have a "stadium" shape including a rectangle with semicircles at opposite ends thereof, which may also be referred to as a discorectangle or an obround. As illustrated in FIG. 7, each of the web openings 130 is centered top-to-bottom in the web 128, has a long axis aligned with a direction from the upper flange 124 to the lower flange 126, and has a short axis extending front-to-back. Each of the web openings 130, or any specific subset thereof, may be equally spaced apart from one another and may extend across a majority of a height of the web 128 aligned with the direction extending from the upper flange 124 to the lower flange 126. Collectively, the web openings 130 may extend across a majority of a length of the I-beam 122 from the front end thereof to the rear end thereof.

As further illustrated in FIG. 7, the web openings 130 can include web openings of different sizes. For example, from front-to-back, the I-beam 122 can include a first, relatively small web opening 130 proximate the front end, then seven relatively large web openings 130, then a last, relatively small web opening 130 proximate the rear end. The term "relatively," in this sense, means relative to or with respect to one another. The first, relatively small web opening 130 and the last, relatively small web opening 130 may have the same dimensions, such as long and short axes, as one another, and each of the seven relatively large web openings 130 may have the same dimensions, such as long and short axes, as one another. The long axes of the relatively large web openings 130 may be larger than the long axes of the relatively small web openings 130, and the short axes of the relatively large web openings 130 may be larger than the short axes of the relatively small web openings 130.

FIG. 7 also illustrates that the web 128 of the I-beam 122 includes a plurality of notches 132 cut into the front and rear ends of the web 128. For example, the web 128 includes a first notch 132a formed at a top end or at an upper portion of the front end of the web 128, where the first notch 132a includes a straight edge adjacent to and extending along the upper flange 124, and a curved edge that curves from an inner end of the straight edge downward and outward toward the front end of the web 128, such that the first notch 132a has a shape of a quarter circle. The web 128 also includes a second notch 132b formed at a bottom end or at a lower portion of the front end of the web 128, where the second notch 132b includes a straight edge adjacent to and extending along the lower flange 126, and a curved edge that curves from an inner end of the straight edge upward and outward toward the front end of the web 128, such that the second notch 132b has a shape of a quarter circle.

The web 128 also includes a third notch 132c formed at a top end or at an upper portion of the rear end of the web 128, where the third notch 132c includes a straight edge adjacent to and extending along the upper flange 124, and a curved edge that curves from an inner end of the straight edge downward and outward toward the rear end of the web 128, such that the third notch 132c has a shape of a quarter circle. The web 128 also includes a fourth notch 132d formed at a bottom end or at a lower portion of the rear end of the web 128, where the fourth notch 132d includes a straight edge adjacent to and extending along the lower flange 126, and a curved edge that curves from an inner end of the straight edge upward and outward toward the rear end of the web 128, such that the fourth notch 132d has a shape of a quarter circle. The notches 132 can be weld joint preparations, and represent just one possible configuration of weld joint preparations. Different weld joint preparations may be used depending on the required load carrying capacity.

Figure 8:
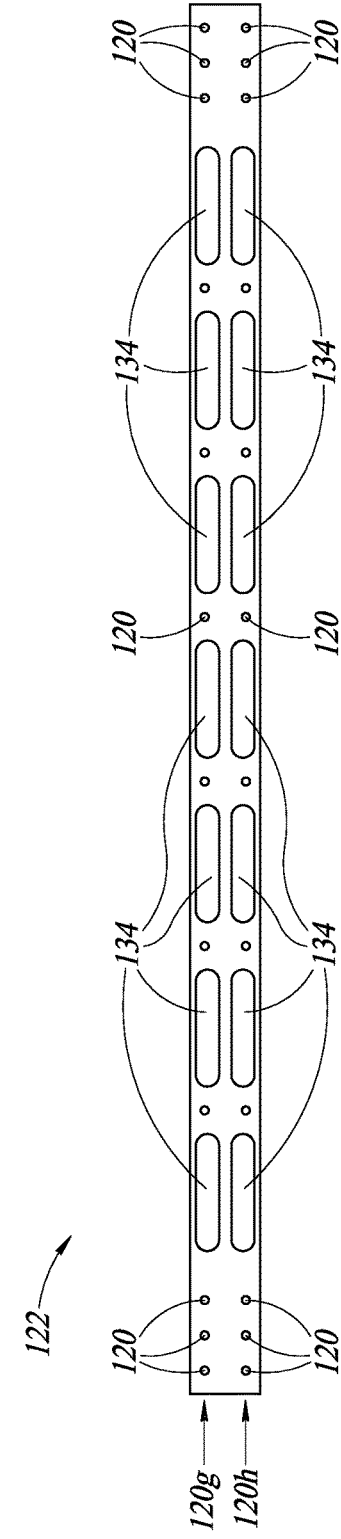
FIG. 8 illustrates a plan view of the I-beam of FIGS. 6 and 7.

FIG. 8 illustrates a top plan view of the I-beam 122. As illustrated in FIG. 8, the upper flange 124 of the I-beam 122 has a plurality of apertures, cutouts, or openings 134 formed therein. For example, the I-beam 122 can include fourteen flange openings 134 arranged in a pair of adjacent and spaced apart lines extending from the front of the I-beam 122 to the rear of the I-beam 122. A first one of the lines of flange openings 134 extends on a first or left side of the upper flange 124 with respect to the web 128, while a second one of the lines of flange openings 134 extends on a second or right side of the upper flange 124, and across from or opposite to the first one of the lines, with respect to the web 128. Further, the first and second lines of flange openings 134 include the same number of (e.g., seven) flange openings 134 and the flange openings 134 include paired flange openings 134 that are aligned with one another from left-to-right. Such paired flange openings 134 include a first flange opening 134 in the first one of the lines and a second flange opening 134 in the second one of the lines that is adjacent to the first flange opening 134, that is, as close as possible given the distance between the first and second lines of flange openings 134.

As illustrated in FIG. 8, each of the flange openings 134 can have an overall circular, oval, elliptical, oblong, or stadium shape. As illustrated in FIG. 8, each of the flange openings 134 has a long axis aligned front-to-back and has a short axis extending side-to-side or left-to-right. Each of the flange openings 134 in the first line of flange openings 134, or any specific subset thereof, and each of the flange openings 134 in the second line of flange openings 134, or any specific subset thereof, may be equally spaced apart from one another. Each of the flange openings 134 may have the same dimensions, such as long and short axes, as one another. Collectively, the flange openings 134 in the first line of flange openings 134, and the flange openings 134 in the second line of flange openings 134, may extend across a majority of a length of the I-beam 122 from the front end thereof to the rear end thereof. Similarly, collectively, the flange openings 134 in a paired set of flange openings 134 may extend across a majority of a width of the upper flange 124 of the I-beam 122 from the left side thereof to the right side thereof.

As further illustrated in FIG. 8, the upper flange 124 includes a plurality of openings, apertures, or bolt holes 120 that extend through the upper flange 124 along respective axes aligned with or parallel to its thickness. As illustrated in FIG. 8, the upper flange 124 includes a first or left line 120g of bolt holes 120 that extends along a left side of the upper flange 124 and a second or right line 120h of bolt holes 120 that extends along a right side of the upper flange 124. The left line 120g of bolt holes 120 and the right line 120h of bolt holes 120 each extend front-to-back along the length of the I-beam 122.

As further illustrated in FIG. 8, the bolt holes 120 include paired bolt holes 120 that are aligned with one another from left-to-right with respect to the I-beam 122. Such paired bolt holes 120 include a first bolt hole 120 in the left line 120g and a second bolt hole 120 in the right line 120h that is adjacent to the first bolt hole 120, that is, as close as possible given the distance between the left and right lines 120g and 120h. Further, the bolt holes 120 are arranged to at least partially alternate with the flange openings 134. For example, from front-to-back, the upper flange 124 includes three sets of paired bolt holes 120 proximate the front of the upper flange 124, then a single set of paired flange openings 134, then a single set of paired bolt holes 120, then a single set of paired flange openings 134, then a single set of paired bolt holes 120, then a single set of paired flange openings 134, then a single set of paired bolt holes 120, then a single set of paired flange openings 134, then a single set of paired bolt holes 120, then a single set of paired flange openings 134, then a single set of paired bolt holes 120, then a single set of paired flange openings 134, then three sets of paired bolt holes 120 proximate the rear of the upper flange 124. The lower flange 126 can be identical to or a mirror image of or incorporate any of the features of the upper flange 124. The lower flange 126 is spaced apart from but parallel to the upper flange 124, such that each spans across a respective opposite end of the I-beam 122. Further, the upper flange 124 and the lower flange 126 are positioned spatially directly on top of one another, such that their respective outer edges or peripheries align with one another when the I-beam 122 is viewed from above or below. Thus, the I-beam 122 is symmetrical front-to-back, side-to-side, and top-to-bottom.

Figure 10:
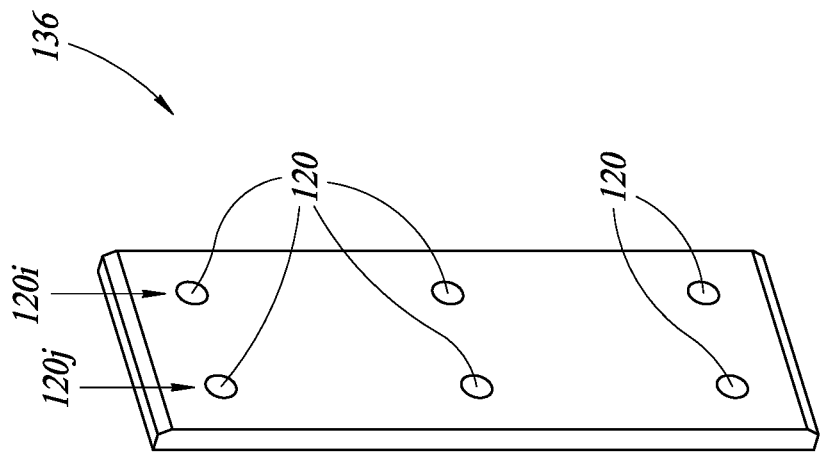
FIG. 10 illustrates another, different perspective view of the end cap plate of FIG. 9.
Figure 9:
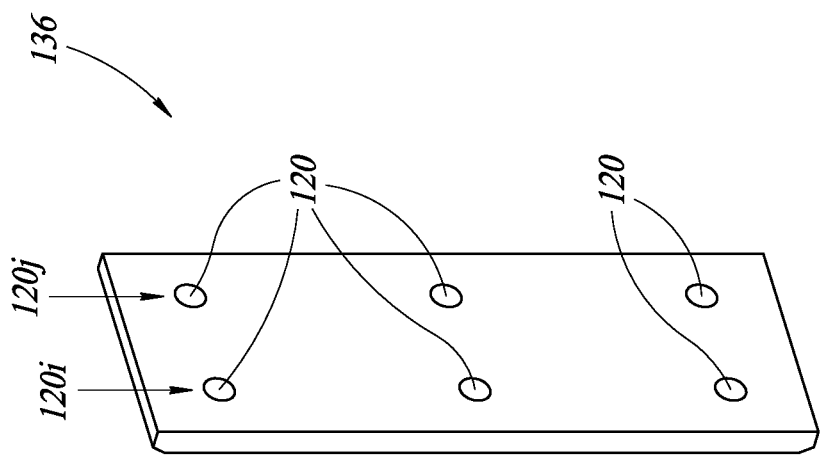
FIG. 9 illustrates a perspective view of an end cap plate of the built-up box beam of FIG. 1.

FIG. 9 illustrates a first perspective view and FIG. 10 illustrates a second, different perspective view of an end cap plate 136 of the built-up box beam 100. As illustrated in FIGS. 9 and 10, the end cap plate 136 includes a rectilinear plate having a length that extends up-and-down in a direction from the top plate 106 to the bottom plate 108, a width perpendicular to its length that extends side-to-side or left-to-right in a direction from the left beam 102 to the right beam 104, and a thickness perpendicular to its length and to its width, where its thickness is significantly smaller than both its length and its width. As illustrated in FIGS. 9 and 10, the end cap plate 136 includes a plurality of (e.g., six) openings, apertures, or bolt holes 120 that extend through the end cap plate 136 along respective axes aligned with or parallel to its thickness.

As illustrated in FIGS. 9 and 10, the end cap plate 136 includes a first line 120i of three bolt holes 120 that extends along a first side of the end cap plate 136 and a second line 120j of three bolt holes 120 that extends along a second side of the end cap plate 136 opposite the first. The first line 120i of bolt holes 120 and the second line 120j of bolt holes 120 each extend up-and-down along the length of the end cap plate 136. As further illustrated in FIGS. 9 and 10, the bolt holes 120 in the end cap plate 136 include paired sets of bolt holes 120 that are aligned with one another from left-to-right. Such paired bolt holes 120 include a first bolt hole 120 in the first line 120i and a second bolt hole 120 in the second line 120j that is adjacent to the first bolt hole 120, that is, as close as possible given the distance between the first and second lines 120i and 120j.

FIGS. 9 and 10 further illustrate that an edge formed at an intersection of a major inner side surface of the end cap plate 136 with a top end surface of the end cap plate 136 is chamfered or beveled, and that an edge formed at an intersection of the major inner side surface of the end cap plate 136 with a bottom end surface of the end cap plate 136 is chamfered or beveled. The end cap plate 136 has an overall height that matches, corresponds to, or is the same as an overall height of the I-beam 122, and has an overall width that matches, corresponds to, or is the same as an overall width of the I-beam 122. The end cap plate 136 is, individually, symmetrical side-to-side and top-to-bottom, but not front-to-back due to the presence of the chamfered or beveled edges. The chamfered or beveled edges can be weld joint preparations, and represent just one possible configuration of weld joint preparations. Different weld joint preparations may be used depending on the required load carrying capacity.

As illustrated in FIGS. 1 and 2 and as described above, the built-up box beam 100 includes the left built-up beam 102, the right built-up beam 104, the top plate 106, and the bottom plate 108. As also illustrated in FIGS. 1 and 2, the left built-up beam 102 includes two of the I-beams 122 described herein and illustrated in FIGS. 6-8 and four of the end cap plates 136 described herein and illustrated in FIGS. 9 and 10. The left built-up beam 102 includes a first one of the I-beams 122 mounted directly on top of, in direct contact with, and rigidly coupled to a second one of the I-beams 122. In particular, a bottom surface of the lower flange 126 of the first one of the I-beams 122 is in direct contact over its full length and width with and flush against the full length and width of a top surface of the upper flange 124 of the second one of the I-beams 122. The first one of the I-beams 122 is rigidly coupled to the second one of the I-beams 122 by any suitable coupling or fastening techniques, such as welding, riveting, or by a plurality of the bolt assemblies 112. The first one of the I-beams 122 and the second one of the I-beams 122 are positioned spatially directly on top of one another, such that their respective outer edges or peripheries align with one another when viewed from above or below.

The left built-up beam 102 also includes a first one of the end cap plates 136 coupled to a front end of the first one of the I-beams 122 such that its chamfered or beveled edges face toward the front end of the first one of the I-beams 122, a second one of the end cap plates 136 coupled to a rear end of the first one of the I-beams 122 such that its chamfered or beveled edges face toward the rear end of the first one of the I-beams 122, a third one of the end cap plates 136 coupled to a front end of the second one of the I-beams 122 such that its chamfered or beveled edges face toward the front end of the second one of the I-beams 122, and a fourth one of the end cap plates 136 coupled to a rear end of the second one of the I-beams 122 such that its chamfered or beveled edges face toward the rear end of the second one of the I-beams 122.

The first end cap plate 136, the first one of the I-beams 122, and the second end cap plate 136 are positioned spatially directly in line with one another front-to-back, such that their respective outer edges or peripheries align with one another when viewed from in front or behind, although in some embodiments the first and second end cap plates 136 are wider than the I-beam such that only top and bottom outer edges or peripheries thereof align with one another when viewed from in front or behind. Further, the third end cap plate 136, the second one of the I-beams 122, and the fourth end cap plate 136 are positioned spatially directly in line with one another front-to-back, such that their respective outer edges or peripheries align with one another when viewed from in front or behind, although in some embodiments the third and fourth end cap plates 136 are wider than the I-beam such that only top and bottom outer edges or peripheries thereof align with one another when viewed from in front or behind. The entire built-up beam 102 is symmetrical top-to-bottom, side-to-side, and front-to-back.

The right built-up beam 104 can be identical to or incorporate any of the features of the left built-up beam 102. As illustrated in FIGS. 1 and 2, the right built-up beam 104 is spaced apart from but parallel to the left built-up beam 102, such that each spans across a respective opposite side of the built-up box beam 100. Further, the left built-up beam 102 and the right built-up beam 104 are positioned spatially directly across from one another from side-to-side or left-to-right, such that their respective outer edges or peripheries align with one another when the built-up box beam 100 is viewed from either side such as its left or its right. Thus, the left built-up beam 102 and the right built-up beam 104, taken together, are collectively symmetrical front-to-back, side-to-side, and top-to-bottom.

As also illustrated in FIGS. 1 and 2, the built-up box beam 100 includes the top plate 106 mounted directly on top of, in direct contact with, and rigidly coupled to both of the left built-up beam 102 and the right built-up beam 104. In particular, a left side portion of the bottom surface of the top plate 106 is in direct contact over its full length with and flush against the full length and width of a top surface of the upper flange 124 of the first one of the I-beams 122 in the left built-up beam 102, and a right side portion of the bottom surface of the top plate 106 is in direct contact over its full length with and flush against the full length and width of a top surface of the upper flange 124 of the first one of the I-beams 122 in the right built-up beam 104. The components are rigidly coupled in this configuration by any suitable coupling or fastening techniques, such as welding, riveting, or by a plurality of the bolt assemblies 112. The left built-up beam 102 and the top plate 106 are positioned spatially directly on top of one another, such that their respective front, left, and rear outer edges or peripheries (except those in some cases of the end cap plates 136) align with one another when viewed from above or below. Further, the right built-up beam 104 and the top plate 106 are positioned spatially directly on top of one another, such that their respective front, right, and rear outer edges or peripheries (except those in some cases of the end cap plates 136) align with one another when viewed from above or below.

As also illustrated in FIGS. 1 and 2, the built-up box beam 100 includes the bottom plate 108 mounted directly to the bottom of, in direct contact with, and rigidly coupled to both of the left built-up beam 102 and the right built-up beam 104. In particular, a left side portion of the top surface of the bottom plate 108 is in direct contact over its full length with and flush against the full length and width of a bottom surface of the lower flange 126 of the second one of the I-beams 122 in the left built-up beam 102, and a right side portion of the top surface of the bottom plate 108 is in direct contact over its full length with and flush against the full length and width of a bottom surface of the lower flange 126 of the second one of the I-beams 122 in the right built-up beam 104. The components are rigidly coupled in this configuration by any suitable coupling or fastening techniques, such as welding, riveting, or by a plurality of the bolt assemblies 112. The left built-up beam 102 and the bottom plate 108 are positioned spatially directly on top of one another, such that their respective front, left, and rear outer edges or peripheries (except those in some cases of the end cap plates 136) align with one another when viewed from above or below. Further, the right built-up beam 104 and the bottom plate 108 are positioned spatially directly on top of one another, such that their respective front, right, and rear outer edges or peripheries (except those in some cases of the end cap plates 136) align with one another when viewed from above or below.

Thus, when the system is viewed as a whole, the built-up box beam 100 includes the left built-up beam 102 as a left side wall thereof, which is designed primarily as a load bearing wall, the right built-up beam 104 as a right side wall thereof, which is also designed primarily as a load bearing wall, the top plate 106 as a top wall thereof, which is designed primarily as a stiffener or stiffening element for the side walls to increase the rigidity of the built-up box beam 100, and the bottom plate 108 as a bottom wall thereof, which is also designed primarily as a stiffener or stiffening element for the side walls to increase the rigidity of the built-up box beam 100.

FIG. 3 illustrates a different perspective view of a portion of the built-up box beam 100 where a front end of the right built-up beam 104 meets a front end of the top plate 106, such that some features of some of the components described herein are illustrated in greater detail.

A method of fabricating, building, or assembling the built-up box beam 100 may include first fabricating the left built-up beam 102 and the right built-up beam 104. Building each of the left built-up beam 102 and the right built-up beam 104 may include first obtaining standard I-beam sections from which the I-beams 122 will be fabricated. Such standard I-beam sections may be fabricated in accordance with generally known, standard techniques, such as hot rolling and/or cold rolling techniques. The method may then include cutting the web openings 130, notches 132, flange openings 134, and bolt holes 120 into the standard I-beam sections to form the I-beams 122 described herein. Such cutting may be performed using CNC thermal cutting techniques to remove the desired material from the webs and flanges of the I-beam sections. Such cutting may also reduce the overall weight of the I-beams 122 by at least 5%, 10%, 15%, 20%, 25%, 30%, 35%, 40%, or 45%, and/or up to 20%, 25%, 30%, 35%, 40%, or 45%.

Building each of the left built-up beam 102 and the right built-up beam 104 may then include bolting the I-beams 122 to one another top-to-bottom in pairs, such as in the configuration described elsewhere herein to form an especially deep yet lightweight built-up beam. In some examples, bolting the I-beams 122 to one another in this manner may include using one of the bolt assemblies 112 described herein with each of the bolt holes 120 in the lower flange 126 of an upper one of the I-beams 122 and with each of the bolt holes 120 in the upper flange 124 of a lower one of the I-beams 122, that is, such that each of the bolt assemblies 112 so used extends through one of the bolt holes 120 in the lower flange 126 of the upper one of the I-beams 122 and one of the bolt holes 120 in the upper flange 124 of the lower one of the I-beams 122. In some examples, 24 of the bolt assemblies 112 are so used.

Building each of the left built-up beam 102 and the right built-up beam 104 may then include coupling the end cap plates 136 to the left and right built-up beams 102 and 104, such as in the configuration described elsewhere herein. Such coupling can be done by welding or other techniques known in the art. Once the end cap plates 136 are attached in this manner, the bolt holes 120 in the end cap plates 136 can be used to couple the built-up box beam 100 to other structural components, such as foundations or additional built-up beams or box beams as described herein. In some implementations, one of the built-up beams described herein can be coupled end-to-end to another one of the built-up beams described herein, either linearly so the built-up beams are aligned with one another, or non-linearly, so that the built-up beams are arranged at an oblique angle to one another. In further implementations, one of the built-up box beams described herein can be coupled end-to-end to another one of the built-up box beams described herein, either linearly so the built-up box beams are aligned with one another, or non-linearly, so that the built-up box beams are arranged at an oblique angle to one another. The geometry of the bolt holes 120 in the end cap plates 136 can vary depending on the required connections and load carrying capacities of the connections.

Building the built-up box beam 100 may then include bolting the top plate 106 and the bottom plate 108 to the left and right built-up beams 102 and 104, such as in the configuration described elsewhere herein. In some examples, bolting the top and bottom plates 106, 108 to the left and right built-up beams 102, 104 in this manner may include using one of the bolt assemblies 112 described herein with each of the bolt holes 120 in the upper flanges 124 of the upper ones of the I-beams 122 in the left and right built-up beams 102, 104, with each of the bolt holes 120 in the lower flanges 126 of the lower ones of the I-beams 122 in the left and right built-up beams 102, 104, and with each of the bolt holes 120 in the top and bottom plates 106, 108, that is, such that each of the bolt assemblies 112 so used extends either: through one of the bolt holes 120 in the upper flange 124 of the upper one of the I-beams 122 in the left built-up beam 102 and one of the bolt holes 120 in the left set 120*a* of bolt holes 120 in the top plate 106; through one of the bolt holes 120 in the lower flange 126 of the lower one of the I-beams 122 in the left built-up beam 102 and one of the bolt holes 120 in the left set 120*a* of bolt holes 120 in the bottom plate 108; through one of the bolt holes 120 in the upper flange 124 of the upper one of the I-beams 122 in the right built-up beam 104 and one of the bolt holes 120 in the right set 120*b* of bolt holes 120 in the top plate 106; or through one of the bolt holes 120 in the lower flange 126 of the lower one of the I-beams 122 in the right built-up beam 104 and one of the bolt holes 120 in the right set 120*b* of bolt holes 120 in the bottom plate 108. In some examples, 124 of the bolt assemblies 112 are so used.

Figure 11:
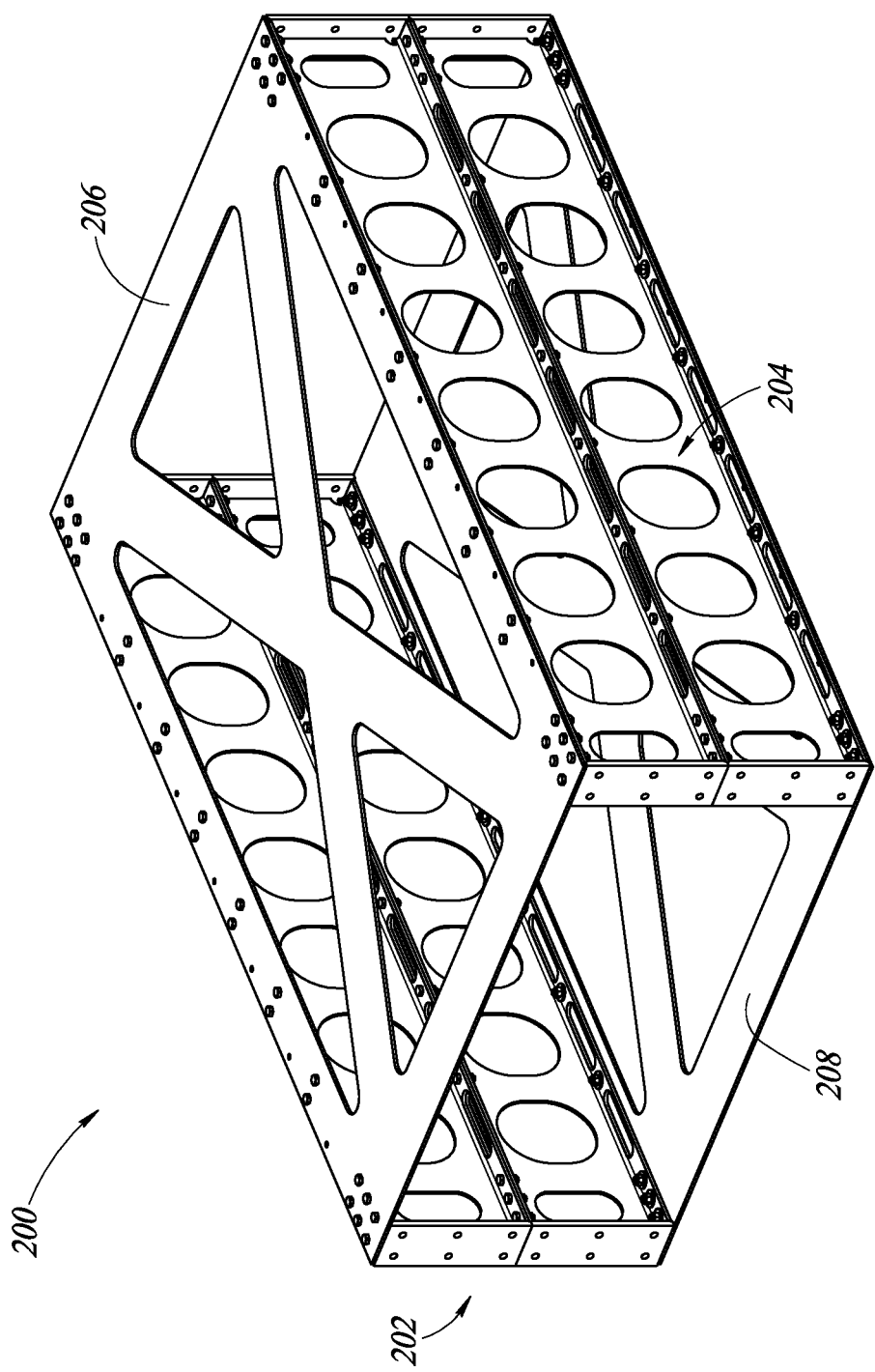
FIG. 11 illustrates a perspective view of another built-up box beam.

FIG. 11 illustrates a front, right, and top perspective view of a built-up box beam 200. As illustrated in FIG. 11, the built-up box beam 200 includes a first individual built-up beam 202, which may be referred to herein as a left beam 202, a second individual built-up beam 204, which may be referred to herein as a right beam 204, a first plate 206, which may be referred to herein as a top plate 206, and a second plate 208, which may be referred to herein as a bottom plate 208. The built-up box beam 200 and the components thereof, including the left beam 202, the right beam 204, the top plate 206, and the bottom plate 208, can include any of the features described herein for the built up box beam 100 and its components, including the left beam 102, the right beam 104, the top plate 106, and the bottom plate 108. The built-up box beam 200 differs from the built-up box beam 100 in that its top plate 206 and its bottom plate 208 include cutouts formed therein such that the top plate 206 and the bottom plate 208 form webbing or a lattice that extends across the top and bottom of the built-up box beam 200, rather than continuous plates.

Figure 12:
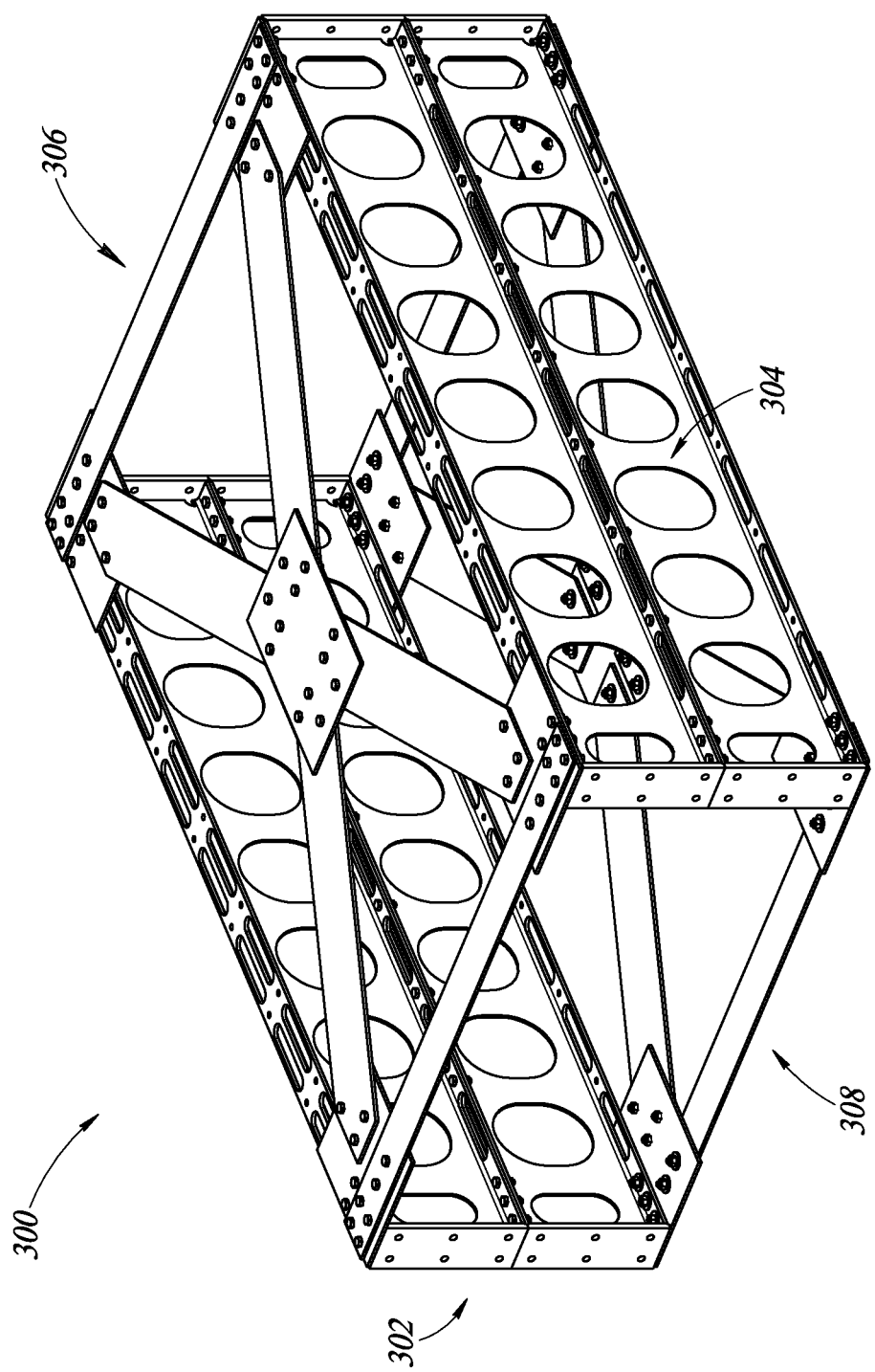
FIG. 12 illustrates a perspective view of another built-up box beam.

FIG. 12 illustrates a front, right, and top perspective view of a built-up box beam 300. As illustrated in FIG. 12, the built-up box beam 300 includes a first individual built-up beam 302, which may be referred to herein as a left beam 302, a second individual built-up beam 304, which may be referred to herein as a right beam 304, a first network of bars 306, which may be referred to herein as top bars 306, and a second network of bars 308, which may be referred to herein as bottom bars 308. The built-up box beam 300 and the components thereof, including the left beam 302, the right beam 304, the top bars 306, and the bottom bars 308, can include any of the features described herein for the built up box beam 100 and its components, including the left beam 102, the right beam 104, the top plate 106, and the bottom plate 108. The built-up box beam 300 differs from the built-up box beam 100 in that it includes the top bars 306 and the bottom bars 308, rather than continuous plates.

As illustrated in FIG. 12, the top bars 306 include a first gusset plate at a top, front, left corner of the built-up box beam 300, a second gusset plate at a top, rear, left corner of the built-up box beam 300, a third gusset plate at a top, front, right corner of the built-up box beam 300, a fourth gusset plate at a top, rear, right corner of the built-up box beam 300, and a fifth gusset plate at a center of the top end of the built-up box beam 300. The top bars 308 also include a first bar that extends from the first gusset plate to the third gusset plate, a second bar that extends from the second gusset plate to the fourth gusset plate, a third bar that extends from the first gusset plate to the fifth gusset plate, a fourth bar that extends from the second gusset plate to the fifth gusset plate, a fifth bar that extends from the third gusset plate to the fifth gusset plate, and a sixth bar that extends from the fourth gusset plate to the fifth gusset plate. The bottom bars 308 can be a mirror image of the top bars 306 with respect to a horizontal plane. While the top bars 306 and the bottom bars 308 are illustrated herein as plate-like, they may have any cross-sectional profile shape, including angle irons, T-shaped, channel sections, I-beams, etc.

The various structures spanning between the built-up beams disclosed herein (e.g., plates 106, 108, 206, 208, bars 306, 308) and other suitable structures for coupling the built-up beams together may be referred to herein as beam spanning members.

Although aspects are described herein largely in the context of the box-beam structures having opposing built-up beams coupled together in a "box-like" arrangement, it is appreciated that the built-up beams described herein are suitable for use in a wide range of building structures whether provided in a box-beam arrangement or in other configurations, or as a free-standing beam.

The systems and methods described herein allow deep, lightweight structural beams to be expeditiously and accurately assembled in the field. In some implementations, the beam components may be shipped in a disassembled configuration to reduce shipping costs by allowing for high density packaging. In other implementations, the beam components may be shipped in an assembled configuration to reduce on-site installation time. Because the systems described herein may be bolted, they are recoverable to allow disassembly and relocation after assembly and use. Because the systems described herein are bolted, an installer can break the weight of individual lifts during installation into smaller increments to reduce required equipment size to complete a given span. Because individual components of the structures described herein are relatively small and light, the manufacturing equipment for processing, lifting, and handling the components is reduced, reducing the overall cost of manufacturing, or effectively increasing an available beam depth given available manufacturing equipment.

Moreover, aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of fabricating a built-up beam, comprising:
obtaining a pair of I-beams, each I-beam having a uniform cross-sectional profile over an entirety of a longitudinal length thereof;
for each of the pair of I-beams, cutting a plurality of web openings and a plurality flange openings in the I-beam to vary the cross-sectional profile of the I-beam over the longitudinal length thereof;
for each of the pair of I-beams, cutting a plurality of bolt holes distinct from the plurality of flange openings in one of opposing flanges of the I-beam along the longitudinal length thereof;
stacking the pair of I-beams together flange-to-flange to form a stacked beam configuration in which the plurality of bolt holes of each I-beam align with each other; and
bolting the pair of I-beams together via the plurality of bolt holes to secure the pair of I-beams together in the stacked beam configuration.

2. The method of claim 1 wherein each of the pair of I-beams is a rolled I-beam.

3. The method of claim 1 wherein each of the pair of I-beams has a common standardized cross-sectional profile.

4. The method of claim 1 wherein cutting the plurality of web openings and the plurality flange openings in each I-beam includes thermal cutting each of the openings.

5. The method of claim 1 wherein cutting the plurality of web openings and the plurality flange openings in each I-beam includes CNC thermal cutting each of the openings.

6. The method of claim 1, further comprising:
for each of the pair of I-beams, cutting a first notch and a second notch into each of opposing ends of a web thereof.

7. The method of claim 1, further comprising:
for each of the pair of I-beams, coupling a respective end cap plate to each of opposing ends thereof.

8. The method of claim 1, further comprising:
obtaining a complementary pair of I-beams, each I-beam having a uniform cross-sectional profile over an entirety of a longitudinal length thereof;
for each of the complementary pair of I-beams, cutting a plurality of web openings and a plurality flange openings in the I-beam to vary the cross-sectional profile of the I-beam over the longitudinal length thereof;
for each of the complementary pair of I-beams, cutting a plurality of bolt holes distinct from the plurality of flange openings in one of opposing flanges of the I-beam along the longitudinal length thereof;
stacking the complementary pair of I-beams together flange-to-flange to form a stacked beam configuration in which the plurality of bolt holes of each I-beam align with each other; and
bolting the complementary pair of I-beams together via the plurality of bolt holes to secure the complementary pair of I-beams together in the stacked beam configuration; and coupling the pair of I-beams in the stacked beam configuration to the complementary pair of I-beams in the stacked beam configuration via one or more beam spanning members.

9. The method of claim 8 wherein coupling the pair of I-beams in the stacked beam configuration to the complementary pair of I-beams in the stacked beam configuration the built-up beam includes coupling the I-beams together to form a built-up box beam.

10. The method of claim 8 wherein coupling the pair of I-beams in the stacked beam configuration to the complementary pair of I-beams in the stacked beam configuration via one or more beam spanning members includes bolting at least one plate between flanges of the I-beams.

11. The method of claim 10 wherein coupling the pair of I-beams in the stacked beam configuration to the complementary pair of I-beams in the stacked beam configuration via one or more beam spanning members includes bolting opposing upper and lower plates between flanges of the I-beams.

* * * * *